United States Patent [19]
Ohya et al.

[11] Patent Number: 5,598,491
[45] Date of Patent: Jan. 28, 1997

[54] OPTICAL FIBER AMPLIFIER AND OPTICAL FIBER TRANSMISSION APPARATUS

[75] Inventors: Jun Ohya; Tomoaki Uno, both of Osaka; Masahiro Mitsuda, Kyoto, all of Japan

[73] Assignee: Matsushita Electric Industrial Co., Ltd., Osaka, Japan

[21] Appl. No.: 517,907

[22] Filed: Aug. 22, 1995

[30] Foreign Application Priority Data

Aug. 23, 1994 [JP] Japan .................................... 6-198301

[51] Int. Cl.$^6$ .................................. G02B 6/28; H01S 3/30
[52] U.S. Cl. ...................... 385/24; 385/123; 385/141; 385/142; 372/6; 359/341; 359/345; 359/115; 359/124
[58] Field of Search ............................. 385/24, 123, 141, 385/142; 372/6; 359/341, 345, 115, 124

[56] References Cited

U.S. PATENT DOCUMENTS

| | | | |
|---|---|---|---|
| 5,239,607 | 8/1993 | da Silva et al. | 372/6 X |
| 5,253,104 | 10/1993 | Delavaux | 359/341 |
| 5,260,823 | 11/1993 | Payne et al. | 359/341 |
| 5,373,526 | 12/1994 | Lam et al. | 372/69 |

*Primary Examiner*—Brian Healy
*Attorney, Agent, or Firm*—Ratner & Prestia

[57] ABSTRACT

The optical fiber amplifier includes a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further includes an optical fiber resonator for laser-oscillating a portion of light of spontaneous emission generated in the rare earth doped optical fiber, which has a wavelength shorter than the wavelength of the signal light, thereby to keep a gain substantially fixed independent of a variation in the wavelength of the signal light.

20 Claims, 14 Drawing Sheets

OPTICAL FIBER AMPLIFIER AND OPTICAL FIBER TRANSMISSION APPARATUS

BACKGROUND OF THE INVENTION

1. Field of the Invention

The present invention relates to an optical fiber amplifier for optically amplifying a light signal and an optical fiber transmission apparatus using the optical fiber amplifier.

2. Description of the Related Art

In a conventional analog light transmission apparatus, a laser diode oscillating at a wavelength in the 1.3 μm band has been used to generate signal light. With a recent development of an optical fiber amplifier doped with erbium (Er) ions capable of optically amplifying light having a wavelength in the 1.55 μm band, an analog light transmission system using a signal falling within this wavelength bandwidth has been developed.

FIG. 14 shows a configuration of such an analog optical fiber transmission apparatus for transmitting light of the 1.55 μm wavelength band. Referring to FIG. 14, signal light (wavelength: 1.55 μm band) emitted from a DFB (distributed feedback) laser 30 is optically amplified by an Er-doped optical fiber amplifier 31. The amplified signal light propagates through a single-mode optical fiber 32 having a length of 10 km and then detected by a light receiver 33. The DFB laser 30 allows the output thereof to be modulated in accordance with an AM-FDM (frequency-division-multiplex) or FM-FDM analog signal. The Er-doped optical fiber amplifier 31 is pumped by laser light (wavelength: 1.48 μm band) emitted from a pumping laser diode (not shown). A photodiode made of InGaAs or an avalanche photodiode is used for the light receiver 33.

An Er-doped optical fiber amplifier provides a high gain for light of the 1.55 μm wavelength band. Thus, by using the Er-doped optical fiber amplifier as a booster amplifier, a totally optical distribution system where all lines from head ends to end users are implemented by optical fibers, can be constructed. This makes it possible to realize an image distribution service covering 100 or more channels and a high-definition TV image distribution service.

The modulation at the laser diode for emitting signal light as mentioned above not only modulates the power of the signal light emitted by the laser diode but also changes the frequency thereof. This phenomenon is called "chirping".

The Er-doped optical fiber amplifier provides a high gain for the light of the 1.55 μm wavelength band, as described above. However, since the gain has a wavelength-dependency (gain tilt), the following problems arise due to the chirping.

When signal light whose power and frequency have both been modulated passes through the optical fiber amplifier, it is subjected to a secondary intermodulation (IM2) distortion caused by the frequency modulation and the gain tilt. As a result, the signal light distorts significantly. In general, the degree of distortion of the signal light at the optical fiber amplifier varies considerably depending on the power of the signal light input into the optical fiber amplifier.

In the case where a plurality of signal light beams with different wavelengths are amplified by a single optical fiber amplifier, the distortion characteristic varies considerably depending on the number of signal light beams, the wavelength, and the input power. This is because the gain and the gain tilt vary depending on these factors.

SUMMARY OF THE INVENTION

The optical fiber amplifier of this invention, includes a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further includes an optical fiber resonator for laser-oscillating a portion of light of spontaneous emission generated in the rare earth doped optical fiber, which has a wavelength shorter than the wavelength of the signal light, thereby to keep a gain substantially fixed independent of a variation in the wavelength of the signal light.

In one embodiment of the invention, the optical fiber resonator selectively returns the portion of light of spontaneous emission generated in the optical fiber, which has a wavelength shorter than the wavelength of the signal light, to the rare earth doped optical fiber as feedback light.

In another embodiment of the invention, the optical fiber resonator includes a feedback optical fiber for selectively allowing the portion of light of the spontaneous emission generated in the rare earth doped optical fiber, which has a wavelength shorter than the wavelength of the signal light to propagate therethrough.

In still another embodiment of the invention, the optical fiber resonator includes a pair of reflectors disposed at the both ends of the rare earth doped optical fiber, and the pair of reflectors selectively reflect a portion of light of spontaneous emission generated in the rare earth doped optical fiber, which has a wavelength shorter than the wavelength of the signal light.

In still another embodiment of the invention, the feedback optical fiber includes filtering means for selectively allowing the portion of light of spontaneous emission generated in the rare earth doped optical fiber doped to pass therethrough.

In still another embodiment of the invention, the feedback optical fiber receives the portion of light of spontaneous emission generated in the rare earth doped optical fiber, which has a wavelength shorter than the wavelength of the signal light, from a signal light output side of the rare earth doped optical fiber, and supplying the portion of light to a signal light input side of the rare earth doped optical fiber.

In still another embodiment of the invention, the feedback optical fiber receives the portion of light of spontaneous emission generated in the rare earth doped optical fiber, which has a wavelength shorter than the wavelength of the signal light, from a signal light input side of the rare earth doped optical fiber, and supplying the portion of light to a signal light output side of the optical fiber.

In still another embodiment of the invention, the feedback optical fiber includes an optical isolator for selectively allowing only light traveling from the signal light input side toward the signal light output side of the rare earth doped optical fiber to pass therethrough.

In still another embodiment of the invention, the feedback optical fiber includes another rare earth doped optical fiber.

In still another embodiment of the invention, each of the pair of reflectors includes a wavelength filter and a reflection mirror.

In still another embodiment of the invention, each of the pair of reflectors includes a fiber grating.

In another aspect of the invention, an optical fiber transmission apparatus is provided. The optical fiber transmission apparatus includes: the optical fiber amplifier according to the invention; a laser diode for outputting signal light modulated according to a multi-channel analog electric signal; an optical fiber for transmitting the signal light amplified by the optical fiber amplifier; and a receiver for converting the signal light transmitted through the optical fiber into an electric signal.

Alternatively, the optical fiber transmission apparatus of this invention includes: the optical fiber amplifier according to the invention; a plurality of laser diodes for outputting signal light beams having different wavelengths; multiplexing means for mixing the signal light beams output from the plurality of laser diodes; an optical fiber for transmitting the signal light amplified by the optical fiber amplifier; and a receiver for converting the signal light transmitted through the optical fiber into an electric signal.

In one embodiment of the invention, wherein at least one of the plurality of laser diodes outputs signal light modulated in accordance with a multi-channel analog electric signal.

In another embodiment of the invention, the wavelength of the signal light is in a 1.55 μm band, and the rare earth doped optical fiber is doped with erbium (Er) ions.

In still another embodiment of the invention, the wavelength of the signal light is in a 1.3 μm band, and the rare earth doped optical fiber is doped with praseodymium (Pr) ions.

Thus, in the optical fiber amplifier according to the present invention, a portion of light of spontaneous emission generated in a rare earth doped optical fiber which has a wavelength shorter than that of the signal light is selectively returned to the optical fiber as feedback light, so as to effect laser-oscillation. For this feedback operation, an additional optical fiber for feedback may be disposed for allowing a portion of light of spontaneous emission generated in the rare earth doped optical fiber which has a wavelength shorter than that of signal light, to selectively propagate therethrough. Alternatively, a pair of reflectors may be disposed at the both ends of the rare earth doped optical fiber, so as to selectively reflect a portion of light of spontaneous emission which has a wavelength shorter than that of signal light. By laser-oscillating light having a wavelength shorter than that of the signal light, the gain, gain tilt, and distortion characteristic of the signal light can be substantially kept fixed even when the power of the signal light is changed over a wider range. This feature has been found by the Inventors of the present invention.

Thus, the invention described herein makes possible the advantages of (1) providing an optical fiber amplifier capable of reducing the fluctuation in the distortion characteristic at the amplification of analog-modulated signal light emitted from a laser diode, and (2) providing an optical fiber transmission apparatus capable of realizing analog light transmission with reduced and stabilized distortion.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

EXAMPLE 1

Figure 1:
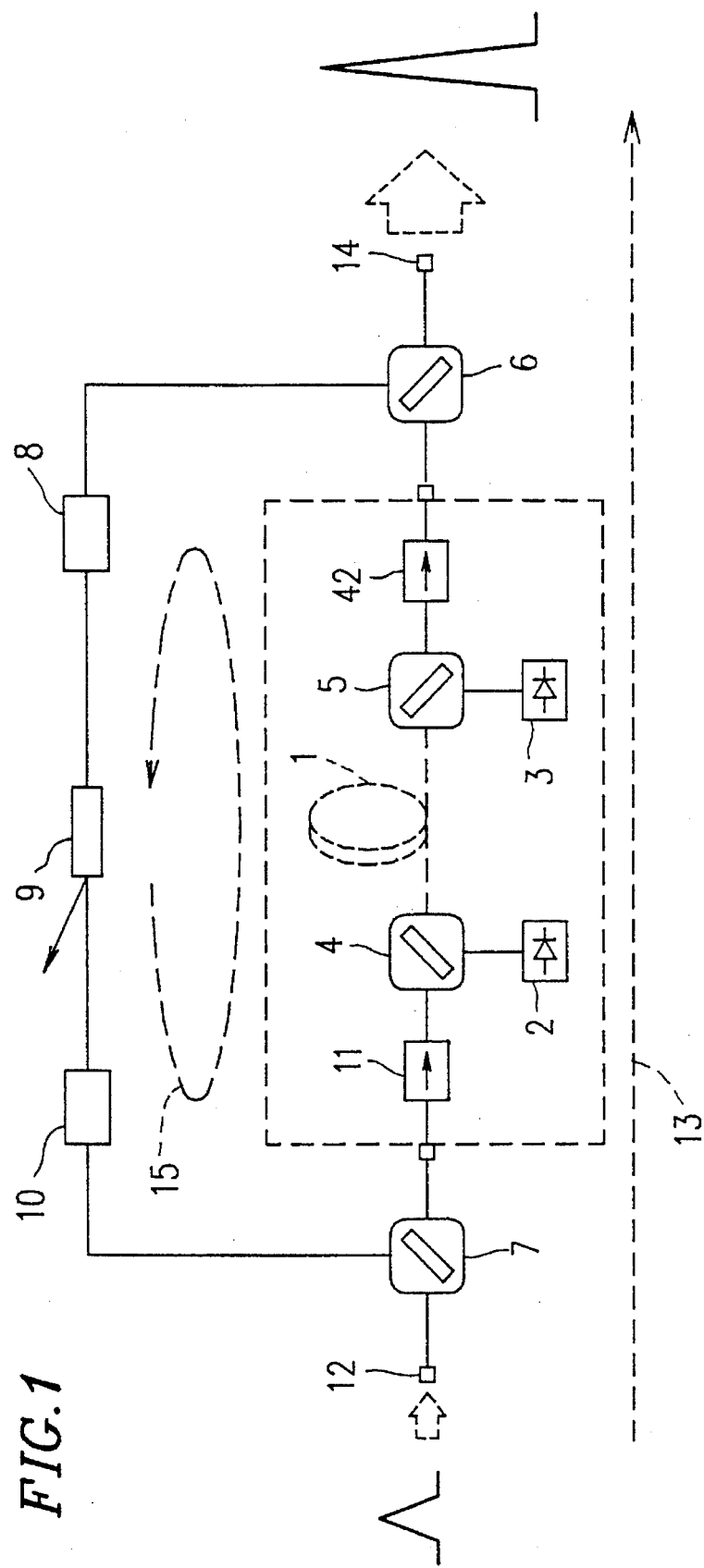
FIG. 1 shows a configuration of a first example of the optical fiber amplifier according to the present invention.

FIG. 1 shows a first example of the optical fiber amplifier according to the present invention. Referring to FIG. 1, the optical fiber amplifier includes an input end 12 through which signal light is input, an amplifying section for amplifying the signal light input through the input end 12, and an output end 14 from which the amplified signal light is output. The optical fiber amplifier of this example also includes an optical fiber resonator between the input end 12 and the output end 14 for the laser-oscillation of a portion of light of spontaneous emission generated in an optical fiber doped with rare earth ions which has a wavelength shorter than that of the signal light. With this configuration, even when the power and the wavelength of the signal light input into the optical fiber amplifier vary considerably, the gain, gain tilt, and distortion characteristic with regard to the signal light can be substantially kept fixed.

The amplifying section includes an Er-doped optical fiber 1 (Er: 270 ppm, Al: 8000 ppm, length: 54 m), and pumping laser diodes 2 and 3 for pumping the Er-doped optical fiber 1. The signal light is amplified while propagating through the pumped and excited Er-doped optical fiber 1. The pumping laser diode 2 emits pumping light having an oscillating wavelength in the 1.48 μm band, which is then mixed with the signal light of the 1.56 μm wavelength band by a multiplexer 4. The pumping laser diode 3 emits pumping light having an oscillating wavelength in the 1.48 μm band, which is then mixed with the signal light of the 1.56 μm wavelength band by a multiplexer 5.

A divider 6 is disposed between the amplifying section and the output end 14 for dividing light into the 1.53 μm wavelength band and the 1.56 μm wavelength band. A multiplexer 7 is disposed between the input end 12 and the amplifying section for mixing the 1.53 μm wavelength band and the 1.56 μm wavelength band. A WDM (wavelengthdivision-multiplex) type optical element is used as the multiplexer 7.

The 1.56 μm band light out of the light amplified in the amplifying section passes through the divider 6 to be output from the output end 14, whereas the 1.53 μm band light enters a closed-loop fiber so as to be input into the multiplexer 7. The 1.53 μm-band light is then mixed with the 1.56 μm-band light.

Optical isolators 11 and 42 are disposed between the multiplexers 7 and 4 and between the multiplexer 5 and the divider 6, respectively, for preventing noise and worsening of distortion.

An optical band-pass filter 8, a 1:9 coupler 9 for output monitoring, and a variable light attenuator 10 are inserted at certain positions of the closed loop fiber. The optical band-pass filter 8 operates as an optical filtering means for selectively transmitting light with a wavelength of 1.535 μm, one of the gain peak wavelengths for the Er-doped optical fiber. A low pass filter can also be used as the optical filtering means. The variable light attenuator 10 controls the gain at the wavelength of 1.535 μm. More specifically, the variable light attenuator 10 adjusts a propagation loss of light with a wavelength of 1.535 μm and varies the power of the 1.535 μm light so as to vary the gain at the wavelength of the signal light.

The signal light of the 1.56 μm wavelength band input through the input end 12 of the optical fiber amplifier is amplified during the propagation along a route 13 and then output from the output end 14. Meanwhile, the light of the 1.53 μm wavelength band of spontaneous emission generated in the Er-doped optical fiber propagates in the closed loop along a route 15, and thus is not output from the output end 14. The route 15 constitutes a ring laser resonator. In the Er-doped optical fiber, when the gain at the wavelength of the signal light is larger than the gain at the wavelength of 1.535 μm, laser-oscillation occurs at the wavelength of 1.535 μm. The gain at the wavelength of 1.535 μm is controlled by the variable light attenuator 10 as described above.

In the example of FIG. 1, two pumping laser diodes 2 and 3 are shown for pumping the Er-doped optical fiber 1. However, only one of the pumping laser diode 2 or 3 may be used.

FIGS. 2 to 5 are graphs showing the results of experiments conducted for the optical fiber amplifier of this example. In the experiments, the total pumping light power was 100 mW, and an output from a DFB laser having a wavelength of 1.561 μm modulated at two tones of a modulation degree of 20%, 950 MHz and 1050 MHz modulation frequencies, was used as the signal light.

Figure 2:
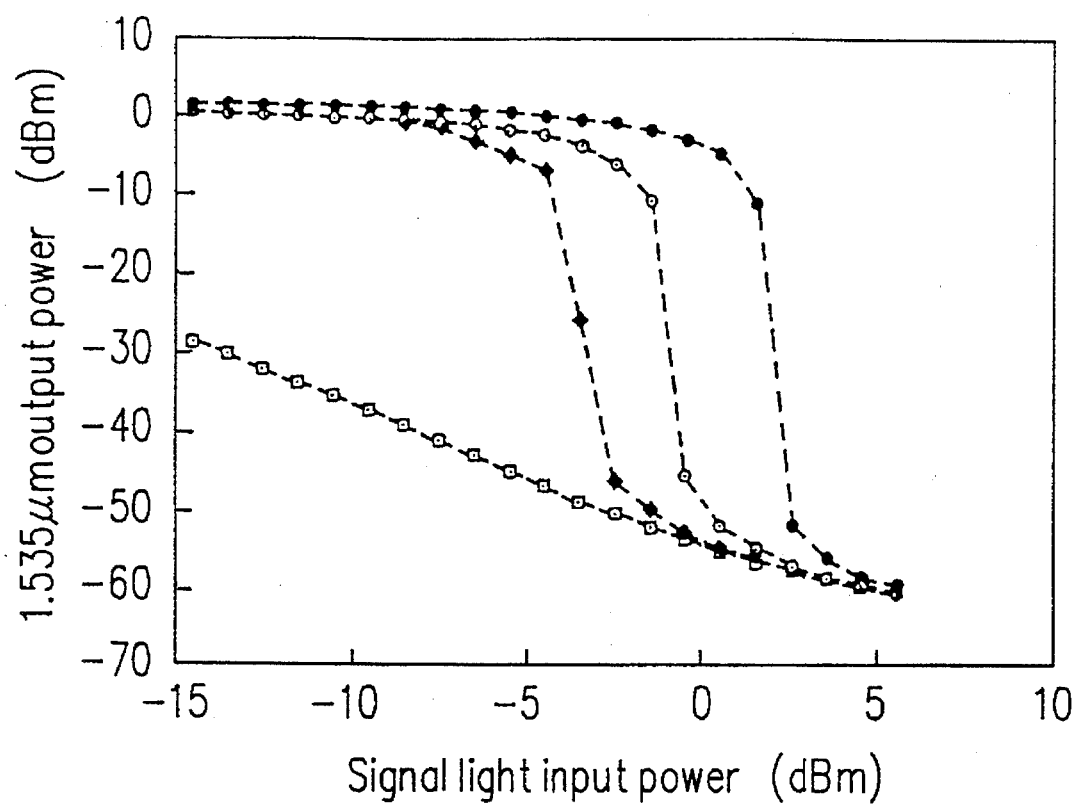
FIG. 2 shows the relationship between the signal light input power and the fiber laser output power for the optical fiber amplifier according to the present invention.

FIG. 2 shows the relationship between the signal light input power and the output power of light with a wavelength of 1.535 μm from the 1:9 coupler 9 when the propagation losses at the variable attenuator 10 are 60 dB (shown as w/o FL in FIG. 2), 15 dB, 10 dB, and 5 dB. For the loss of 15 dB or less at the variable attenuator 10, the laser oscillation at 1.535 μm occurs when the signal light input power is low. As is observed from FIG. 2, the 1.535 μm output light keeps a substantially fixed output power when the signal light input power is in the range of −15 to −5 dBm, except for the case of 60 dB loss.

Figure 3:
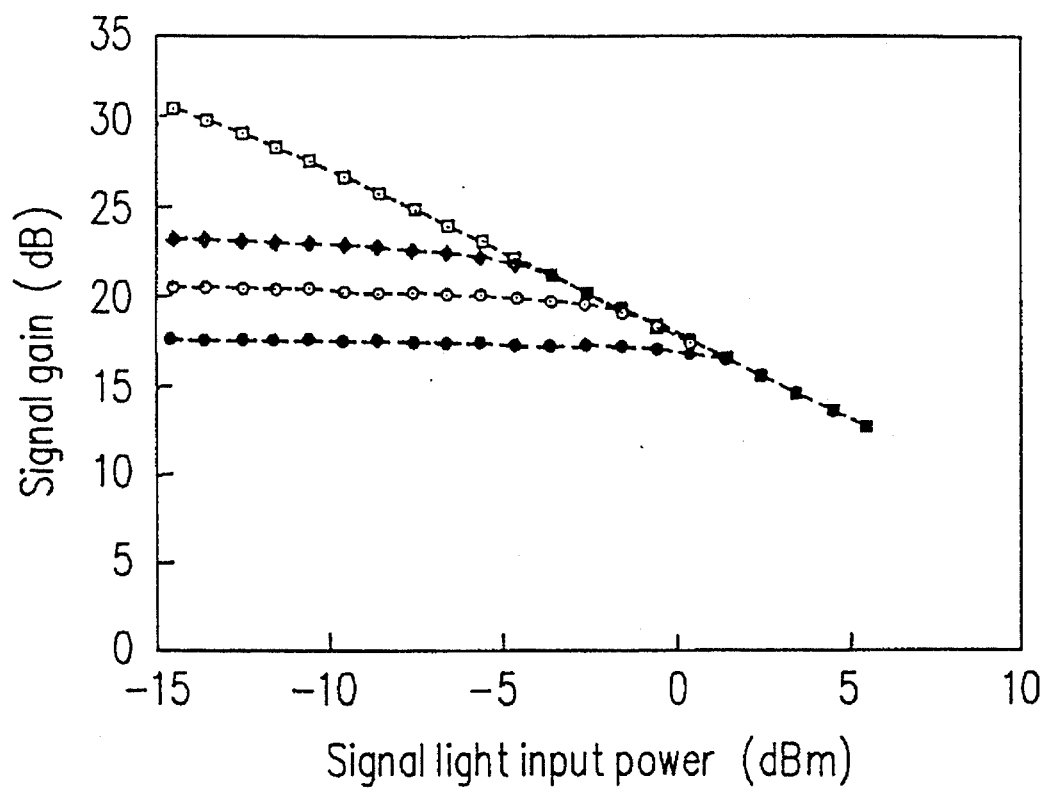
FIG. 3 shows the dependency of the signal gain upon the signal light input power for the optical fiber amplifier according to the present invention.

FIG. 3 shows the dependency of the signal gain upon the signal light input power. As is observed by comparing this figure with FIG. 2, when the light with a wavelength of 1.535 μm is laser-oscillated in the ring resonator, the signal gain keeps a substantially fixed value independent of the change in the signal light input power. For example, when the loss at the variable light attenuator 10 is 5 dB, the gain is kept fixed when the signal light input power is in the range of −15 to 0 dBm. In other words, the gain is kept fixed independent of the change in the signal light input power.

Figure 4:
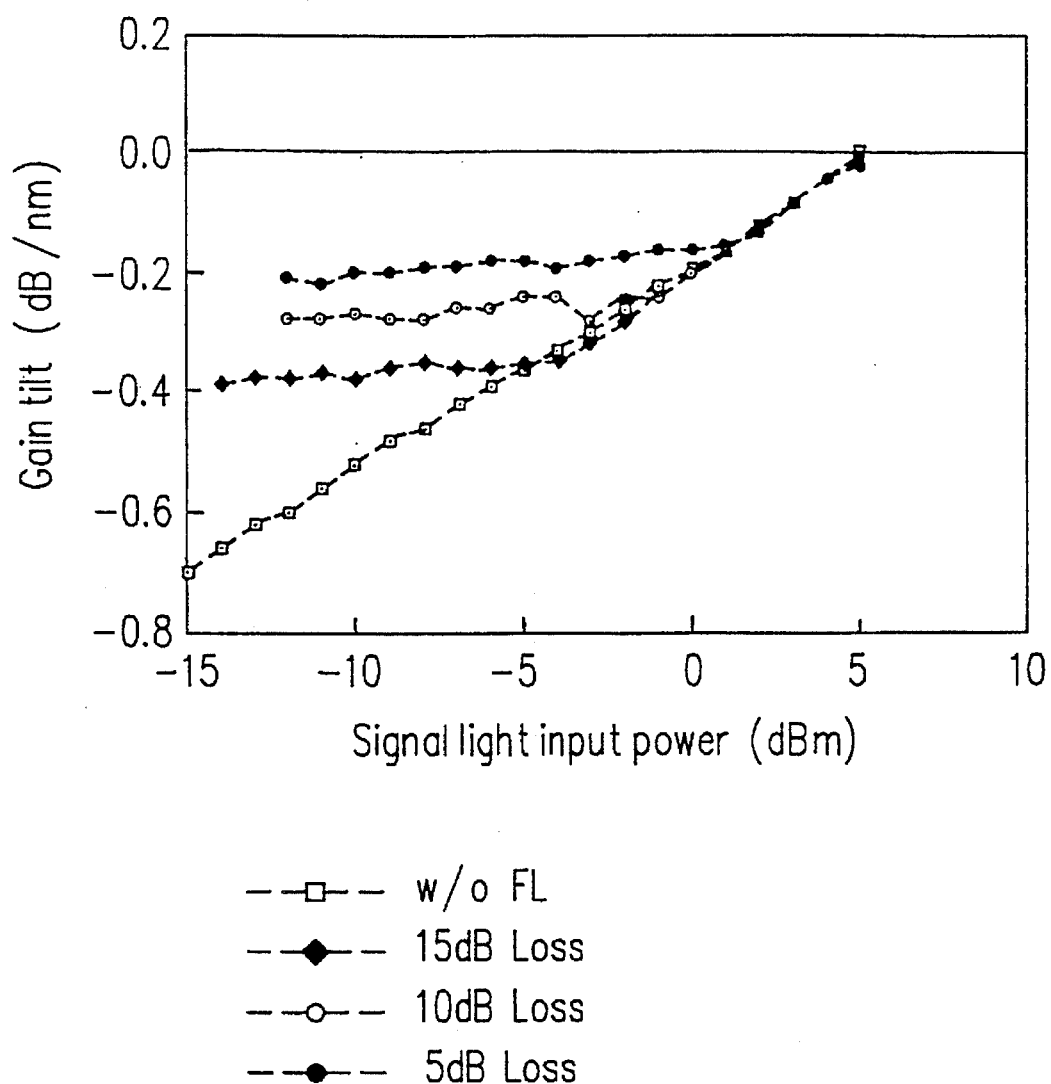
FIG. 4 shows the dependency of the gain tilt upon the signal light input power for the optical fiber amplifier according to the present invention.

FIG. 4 shows the dependency of the gain tilt upon the signal light input power. As in the case of the signal gain shown in FIG. 3, when the light with a wavelength of 1.535 μm is laser-oscillated in the ring resonator, the gain tilt keeps a substantially fixed value independent of the change in the signal light input power.

Figure 5:
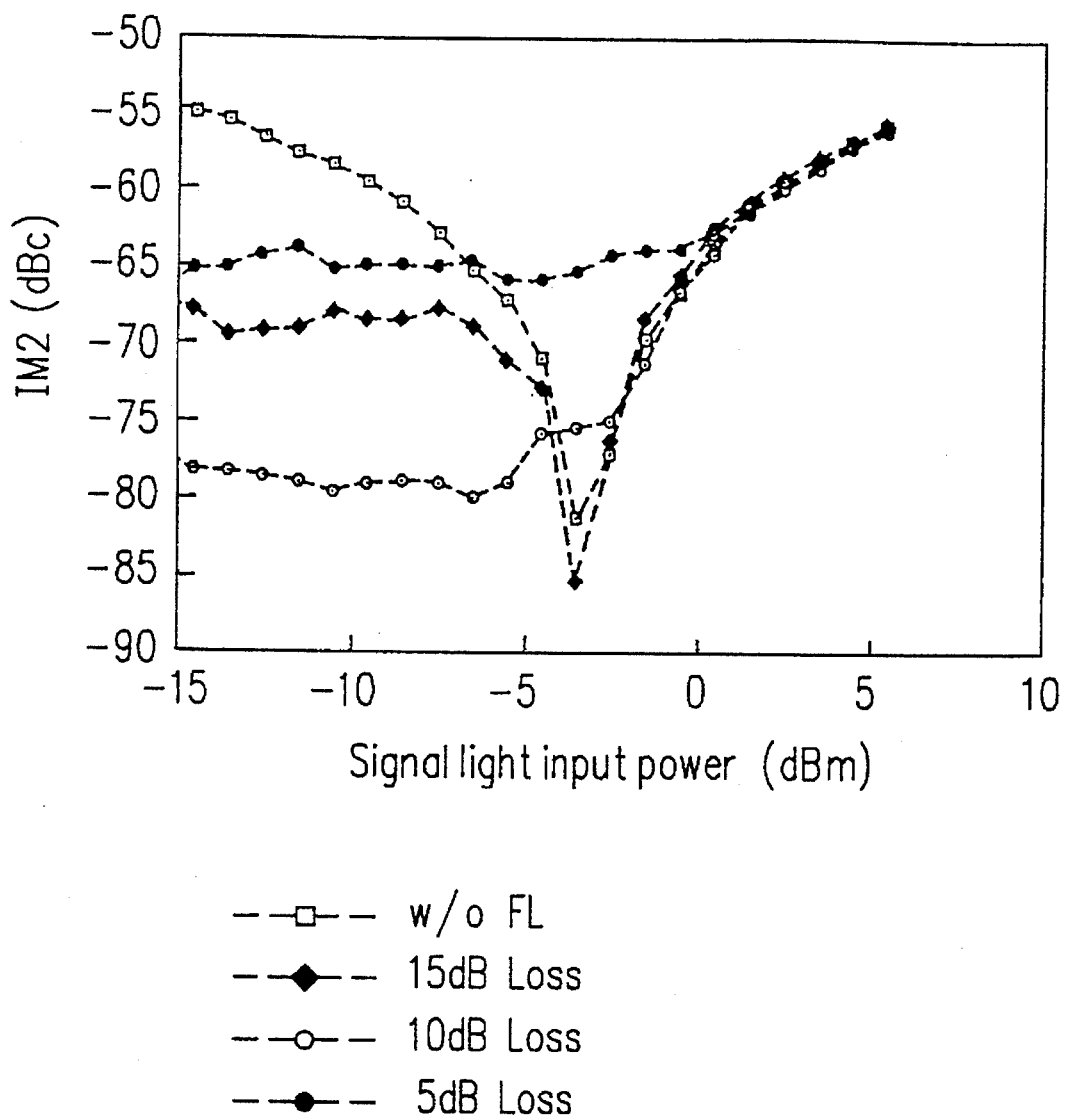
FIG. 5 shows the dependency of the secondary intermodulation distortion upon the signal light input power for the optical fiber amplifier according to the present invention.

FIG. 5 shows the dependency of the secondary intermodulation (IM2) distortion at the frequency of 100 MHz under the above conditions. In the case where the loss at the variable light attenuator 10 is 60 dB (w/o FL), which is too large to cause the laser-oscillation at 1.535 μm, the IM2 distortion becomes large when the signal light input power is in a higher range or in a lower range. In the case where the loss at the variable light attenuator 10 is so small as to allow the laser-oscillation at 1.535 μm to occur, since the gain tilt does not vary as shown in FIG. 4, a variation in the IM2 distortion which is caused by the gain tilt is suppressed. Thus, a distortion characteristic is as low as −6.0 dBc or less.

Figure 6A:
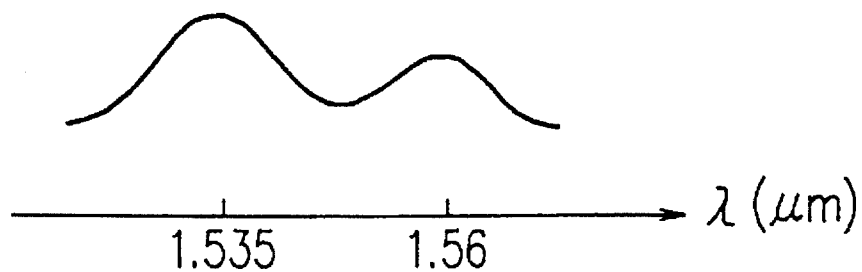
FIGS. 6A to 6C respectively show the power of spontaneous emission of an optical fiber doped with rare earth ions.
Figure 6B:
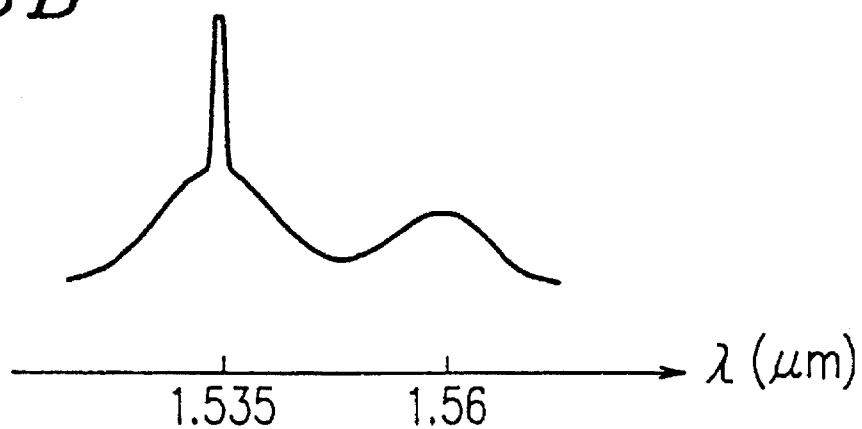
Figure 6C:
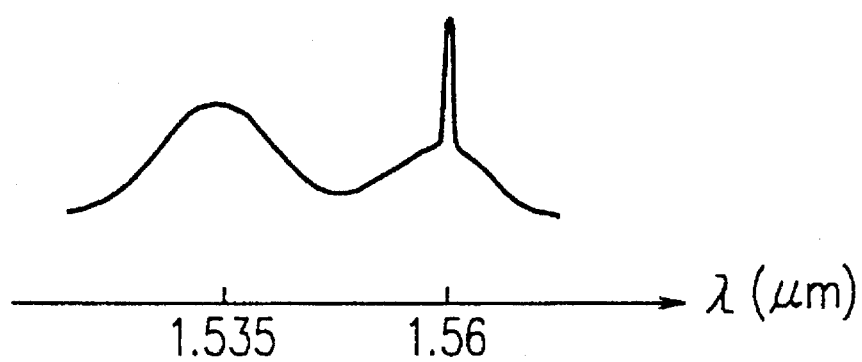

The power of the spontaneous emission of the Er-doped optical fiber 1 has the wavelength-dependency as shown in FIGS. 6A to 6C. FIGS. 6A to 6C respectively represent the power profiles when no signal light is input, when 1.535 μm light is input, and when 1.56 μm light is input.

As is observed from FIG. 6B, when the 1.535 μm light is oscillated with a large gain, the input signal is amplified while the gain and the gain tilt of the incident signal light are independent of the input power. As is observed from FIG. 6C, when the 1.535 μm light is no longer oscillated, the gain and the gain tilt of the signal light vary depending on the signal light input power.

As shown in FIGS. 2 to 5, according to the present invention, variations in the gain and the gain tilt are suppressed independent of a change in the signal light input power. As a result, the distortion characteristic generated by the interaction between a frequency-modulation component of the signal light and the gain tilt does not vary. Thus, an optical fiber amplifier with a low distortion and a stable operation is realized. The gain and the distortion characteristic can also be controlled by varying the loss at the variable attenuator.

According to the present invention, a portion of light of the spontaneous emission of the rare earth doped optical fiber, which has a wavelength shorter than that of the signal light, is laser-oscillated between the input end 12 and the output end 14. The following effects can be obtained by using the portion of the spontaneous emission which has a wavelength shorter than that of the signal light as the feedback light to the Er-doped optical fiber for laser-oscillating the optical fiber.

Figure 7:
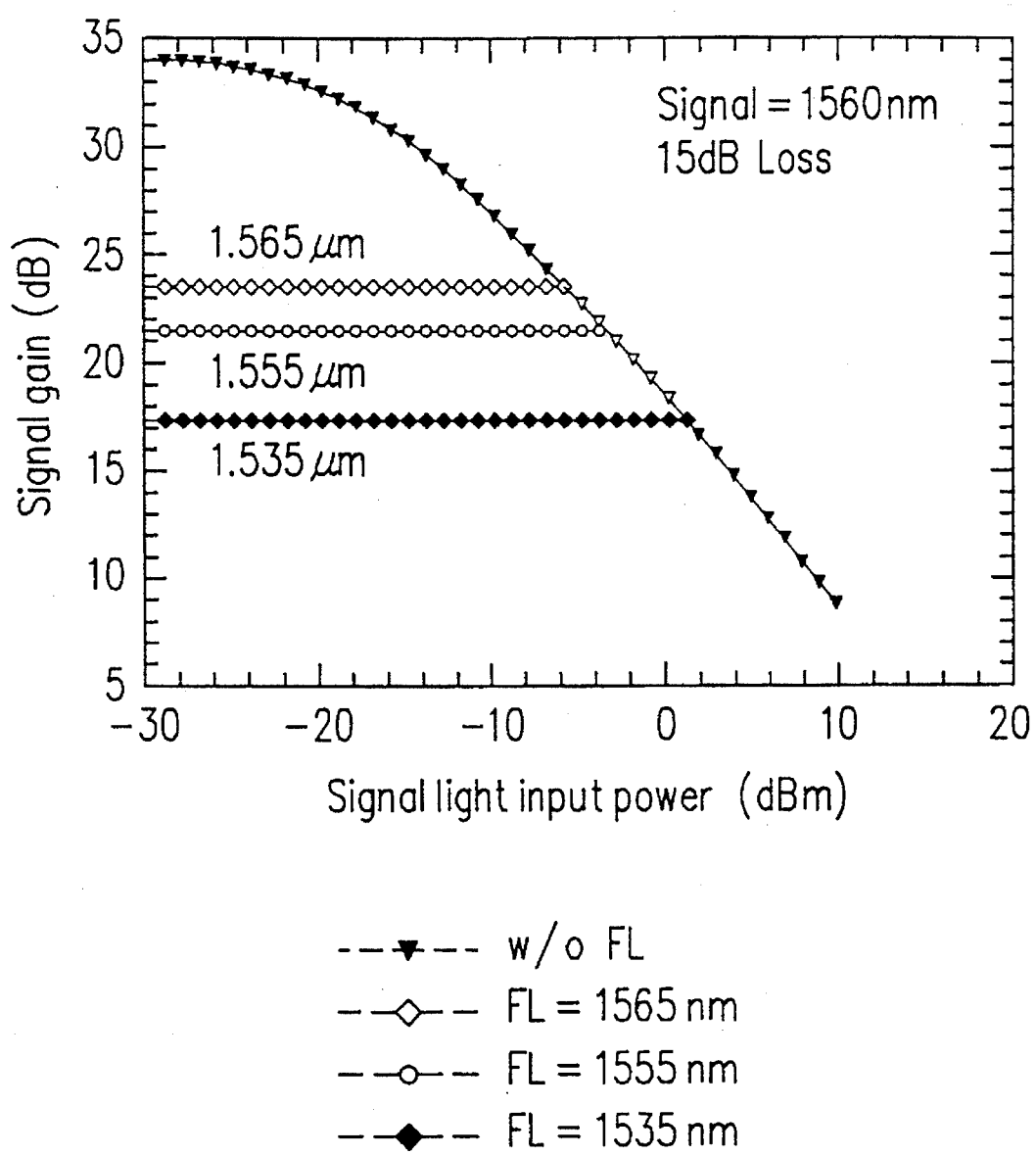
FIG. 7 shows the dependency of the signal gain upon the signal input power.

FIG. 7 shows how "the dependency of the signal gain upon the signal light input power" varies depending on the wavelength of light which is used as the feedback light to the Er-doped optical fiber. As is observed from FIG. 7, the range of the signal light input power where the gain is substantially kept fixed independent of the power of the signal light is wider as the wavelength of the feedback light is shorter. At this time, the range where the gain tilt is kept fixed is also wider, resulting in widening the range where the distortion characteristic does not vary. This feature has been found by the Inventors of the present invention.

EXAMPLE 2

Figure 8:
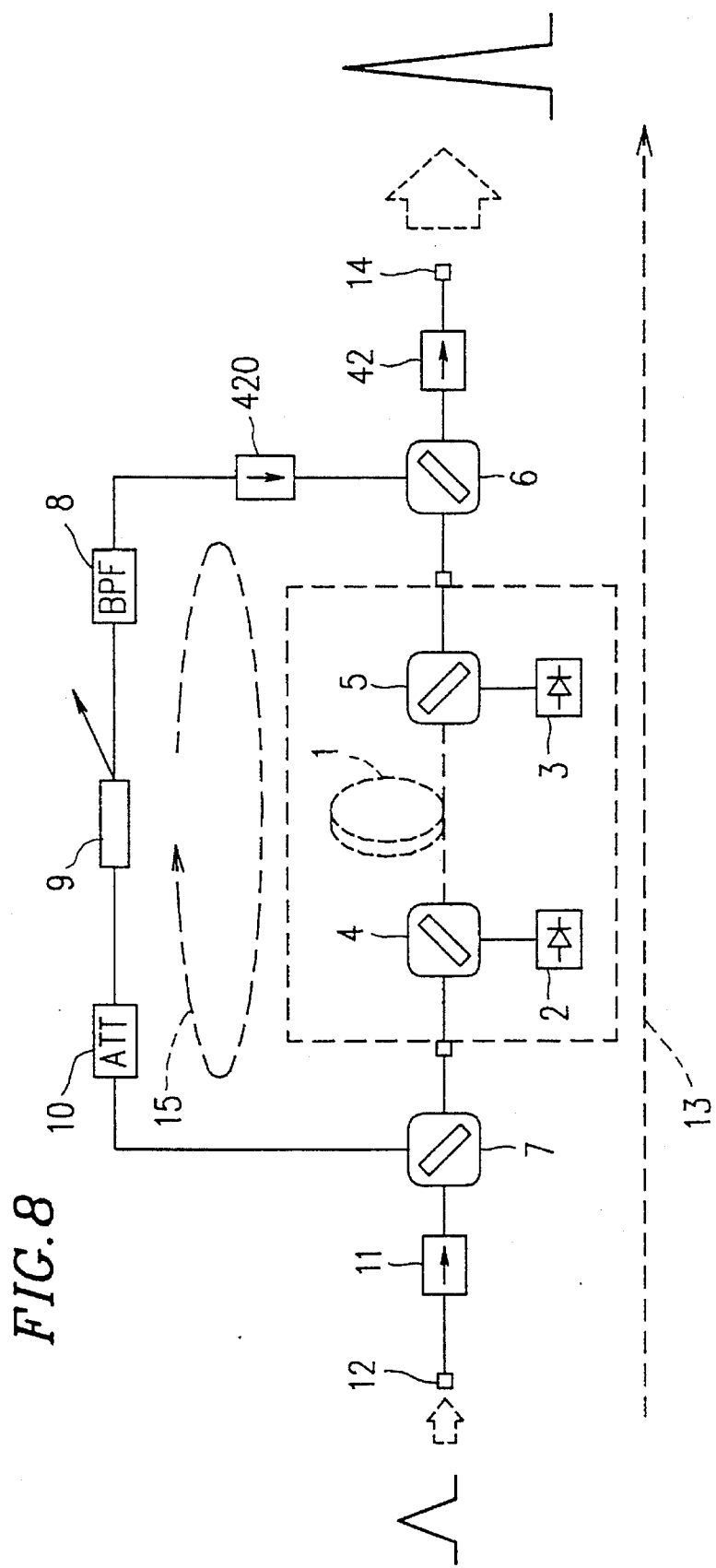
FIG. 8 shows a configuration of a second example of the optical fiber amplifier according to the present invention.

FIG. 8 shows a second example of the optical fiber amplifier according to the present invention. In FIG. 8, components corresponding to those of the optical fiber amplifier of Example 1 shown in FIG. 1 are denoted by the same reference numerals. In this example, only major differences from the optical fiber amplifier of Example 1 will be described.

In the optical fiber amplifier of this example, the isolators 11 and 42 are disposed outside the closed loop, and an additional isolator 420 is disposed on the closed loop fiber. This configuration causes the 1.53 μm band light to propagate clockwise. In the optical fiber amplifier of FIG. 1, the 1.53 μm band light may leak from the output end 14. Especially, when the input power of the signal light is small, the extinction ratio of the 1.53 μm band light to the 1.56 μm band light among the output light deteriorates. In the optical fiber amplifier of FIG. 8, however, since the 1.53 μm band light propagates clockwise, the extinction ratio does not deteriorate even though the input power of the signal light is small.

EXAMPLE 3

Figure 9:
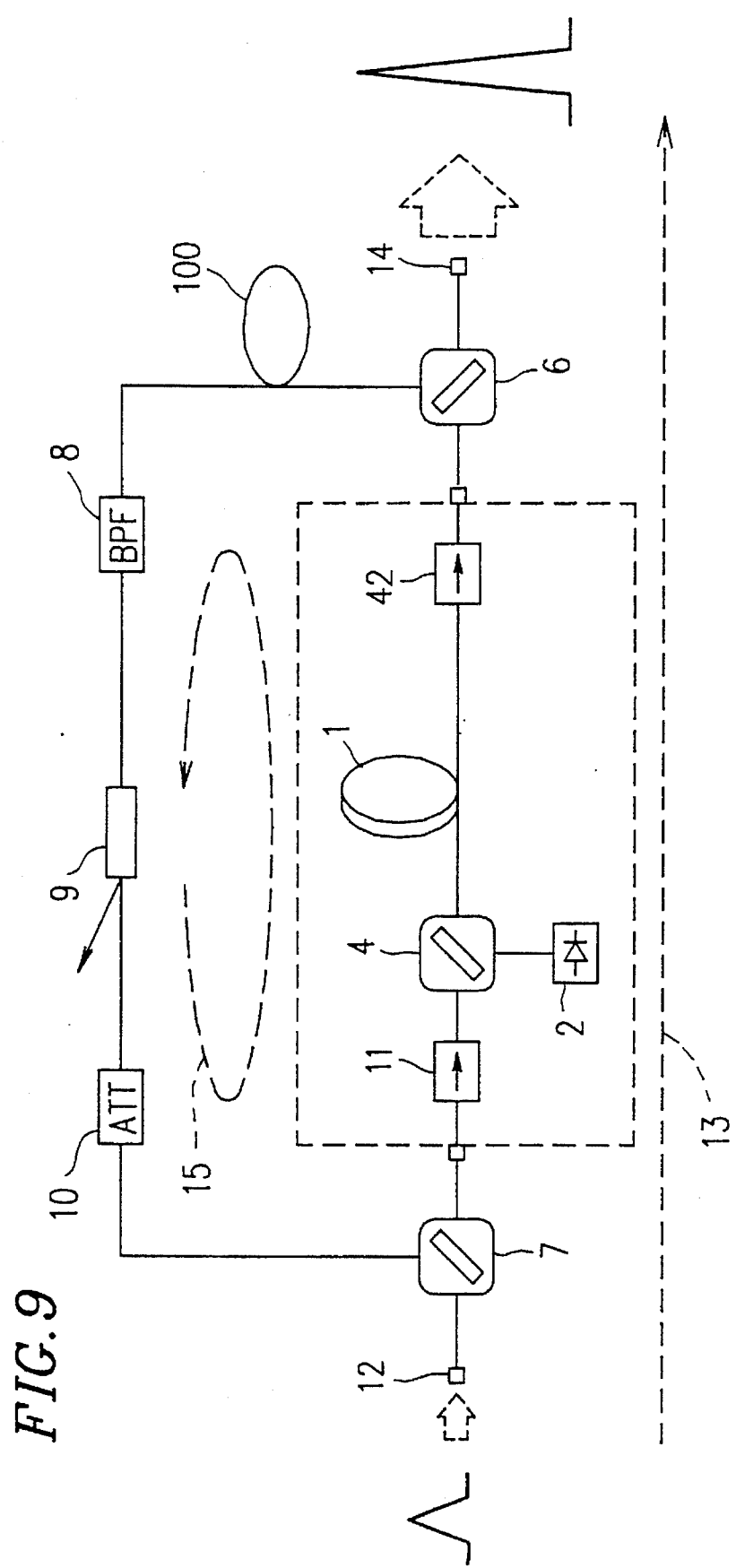
FIG. 9 shows a configuration of a third example of the optical fiber amplifier according to the present invention.

FIG. 9 shows a third example of the optical fiber amplifier according to the present invention. In FIG. 9, components corresponding to those of the optical fiber amplifier of Example 1 shown in FIG. 1 are denoted by the same reference numerals. In this example, only major differences from the optical fiber amplifier of Example 1 will be described.

In the optical fiber amplifier of this example, an Er-doped optical fiber 100 is inserted as a portion of the closed loop fiber, and the pumping laser diode 3 and the multiplexer 5 in FIG. 1 are omitted. The inserted Er-doped optical fiber 100 is pumped by 1.48 μm band light emitted by the pumping laser diode 2. In the optical fiber amplifier of this example, not only the 1.53 μm band light but also the 1.48 μm band pumping light propagate in the closed loop.

The 1.53 μm band light can be amplified by the insertion of the Er-doped optical fiber 100. As a result, the propagation loss at the closed loop optical fiber is reduced, and thus the gain, gain tilt, and distortion characteristic are kept fixed even when large signal light is input.

EXAMPLE 4

Figure 10:
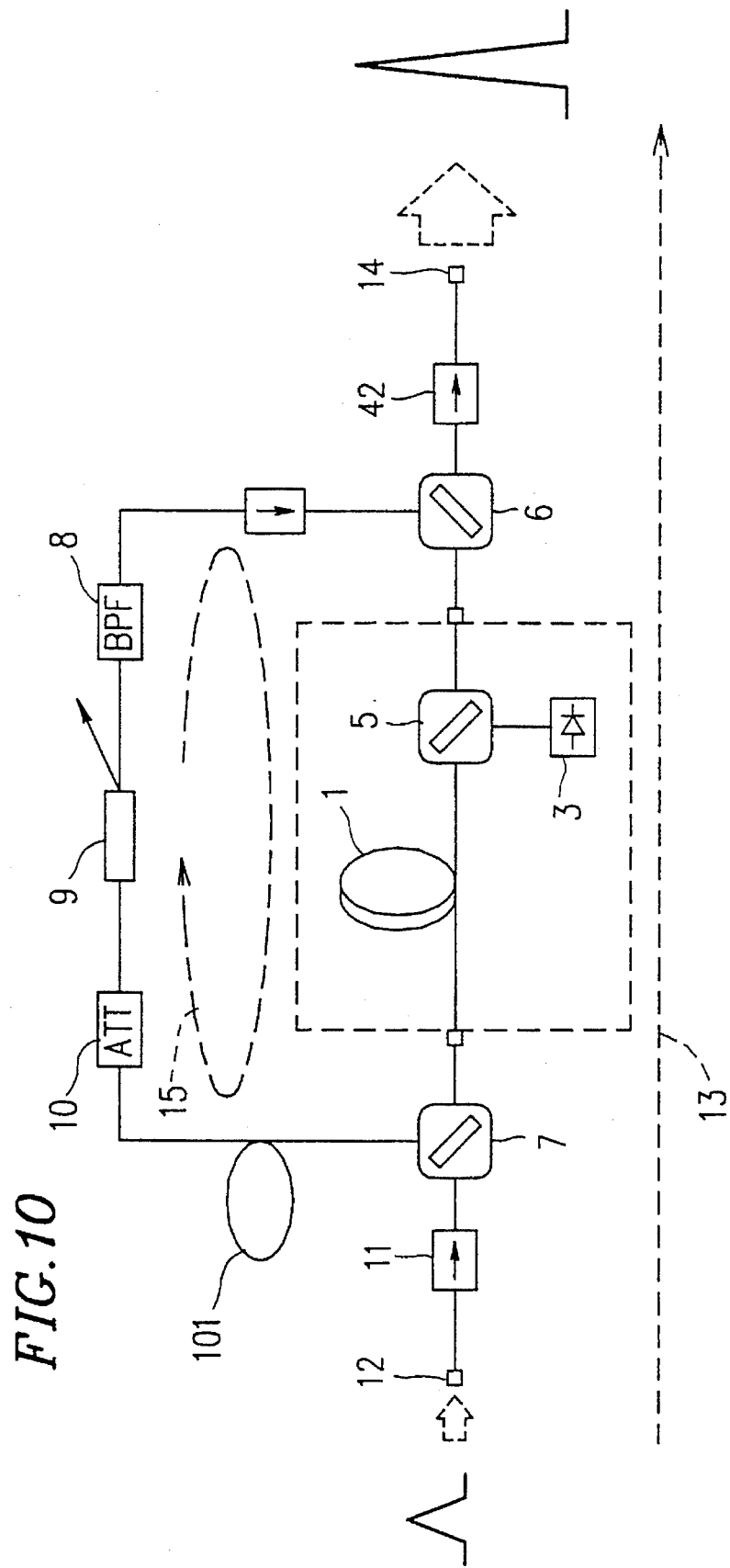
FIG. 10 shows a configuration of a fourth example of the optical fiber amplifier according to the present invention.

FIG. 10 shows a fourth example of the optical fiber amplifier according to the present invention. In FIG. 10, components corresponding to those of the optical fiber amplifier of Example 1 shown in FIG. 1 are denoted by the same reference numerals. In this example, only major differences from the optical fiber amplifier of Example 1 will be described.

In the optical fiber amplifier of this example, an Er-doped optical fiber 101 is inserted as a portion of the closed loop fiber, and the pumping laser diode 2 and the multiplexer 4 in FIG. 1 are omitted. The inserted Er-doped optical fiber 101 is pumped by 1.48 μm band light emitted by the pumping laser diode 3. In the optical fiber amplifier of this example, not only the 1.53 μm band light but also the 1.48 μm pumping light propagate in the closed loop. These types of light propagate clockwise as in Example 2 shown in FIG. 8. The multiplexer 5 allows both the 1.53 μm band light and the 1.56 μm band light to transmit in the direction along a route 15.

The 1.53 μm band light can be amplified by the inserted Er-doped optical fiber 101. As a result, the propagation loss at the closed loop optical fiber is reduced, and thus the gain, gain tilt, and distortion characteristic are kept fixed even when a large signal light is input.

EXAMPLE 5

Figure 11:
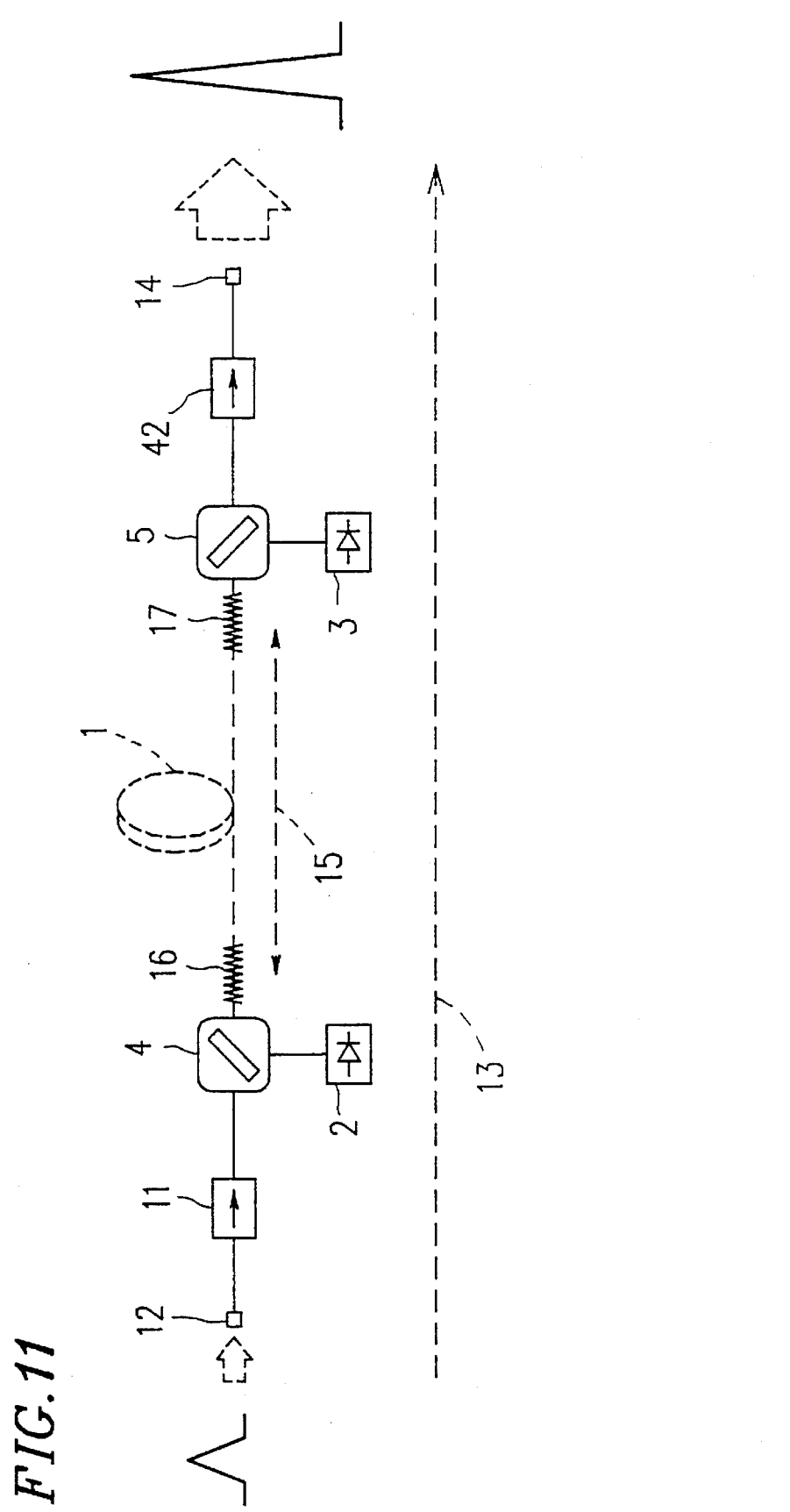
FIG. 11 shows a configuration of a fifth example of the optical fiber amplifier according to the present invention.

FIG. 11 shows a fifth example of the optical fiber amplifier according to the present invention.

The optical fiber amplifier of this example includes an input end 12 through which signal light is input, an amplifying section for amplifying the signal light input through the input end 12, and an output end 14 from which the amplified signal light is output.

The amplifying section includes an Er-doped optical fiber 1 (Er: 270 ppm, Al: 8000 ppm, length: 54 m), and pumping laser diodes 2 and 3 for pumping the Er-doped optical fiber 1. The signal light is amplified while propagating through the pumped Er-doped optical fiber 1. The pumping laser diode 2 emits pumping light having an oscillating wavelength in the 1.48 μm band, which is then mixed with the signal light having a wavelength in the 1.55 μm band by a multiplexer 4. The pumping laser diode 3 emits pumping light having an oscillating wavelength in the 1.48 μm band, which is then mixed with the 1.55 μm band signal light by a multiplexer 5.

Optical isolators 11 and 42 are disposed between the input end 12 and the multiplexer 4 and between the multiplexer 5 and the output end 14, respectively, for preventing noise and worsening of distortion.

Between the multiplexers 4 and 5 are disposed fiber gratings 16 and 17 for reflecting light having a wavelength of 1.535 μm, so as to constitute a fiber laser resonator. With this configuration, the 1.56 μm band light out of the light amplified in the amplifying section passes through the multiplexer 5 and the optical isolator 42 to be output from the output end 14, whereas the 1.53 μm band light is confined within the fiber laser resonator.

In the optical fiber amplifier of this example, based on the principle described with reference to Example 1, variations in the gain and the gain tilt are suppressed independent of a change in the signal light input power. As a result, a stable operation is attained where the distortion characteristic, which is generated by the interaction between a frequency-modulation component of the signal light and the gain tilt, does not vary.

Since the divider 6 and the multiplexer 7 shown in FIG. 1 are not required in this example, the loss of the signal light can be reduced. Further, since the loss of the 1.535 μm light is also reduced, the distortion characteristic does not vary even when signal light with a high power is input; thus a stable operation is obtained.

EXAMPLE 6

Figure 12:
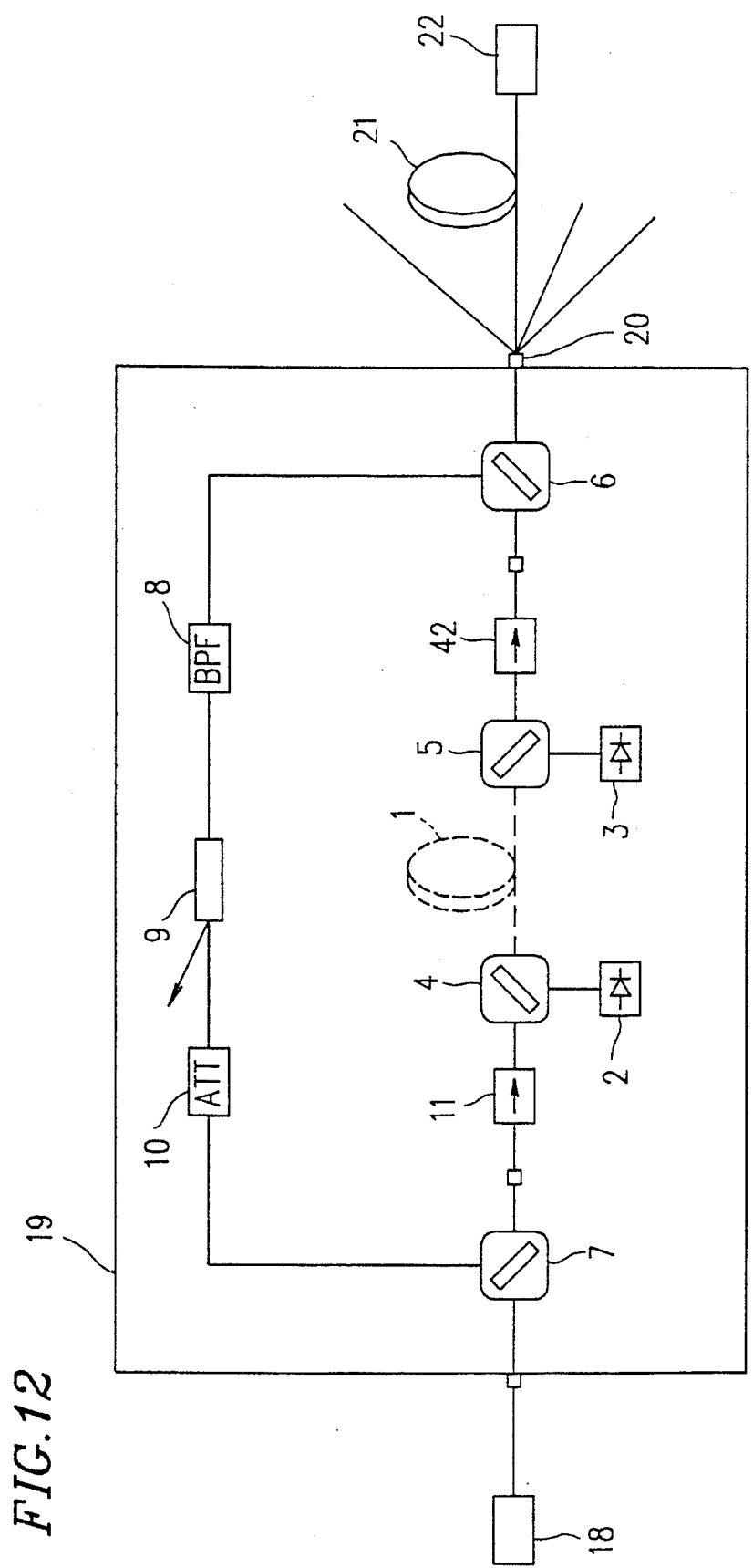
FIG. 12 shows a configuration of an optical fiber transmission apparatus according to the present invention.

FIG. 12 shows an optical fiber transmission apparatus according to the present invention.

Signal light emitted from a DFB laser 18 modulated in accordance with an AM42-channel analog image signal is amplified by an optical fiber amplifier 19 which has the same configuration as the optical fiber amplifier shown in FIG. 1. The amplified signal light is then branched by a branch device 20. Each of the branched light is transmitted through an optical fiber 21 and then received by a receiver 22. According to the optical fiber transmission apparatus with the above configuration, variations in the gain and the gain tilt are suppressed independent of a change in the input power of the signal light. Thus, the CSO distortion characteristic generated by the interaction between a frequency-modulation component of the signal light and the gain tilt does not vary.

EXAMPLE 7

Figure 13:
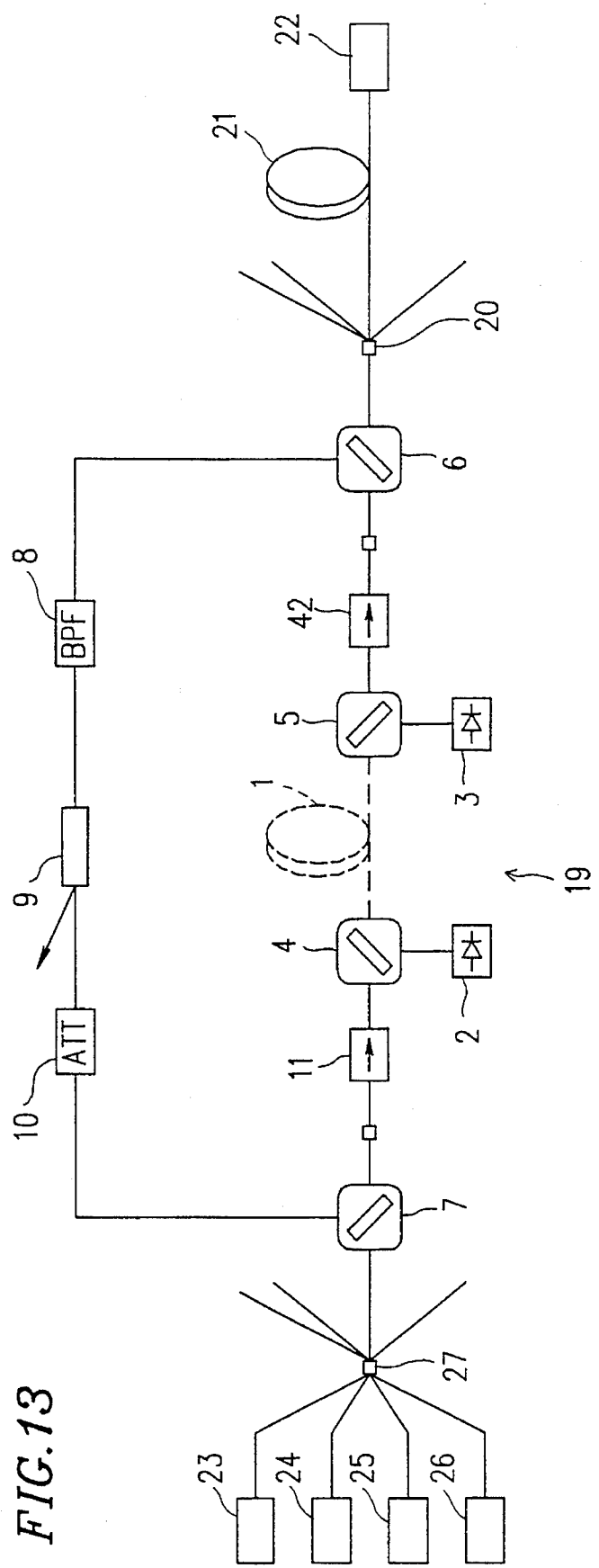
FIG. 13 shows a configuration of another optical fiber transmission apparatus according to the present invention.
Figure 14:
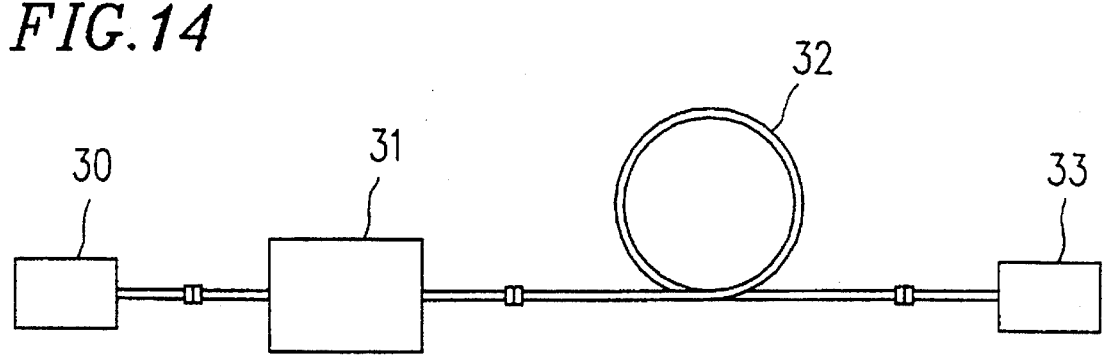
FIG. 14 shows a configuration of a conventional optical fiber transmission apparatus.

FIG. 13 shows another optical fiber transmission apparatus according to the present invention. The optical fiber transmission apparatus of this example includes DFB lasers 23 to 26 for signals having wavelengths of 1.550 µm, 1.555 µm, 1.560 µm, and 1.565 µm, respectively, and a star coupler 27. The DFB laser 25 allows the output thereof to be modulated in accordance with an AM42-channel analog image signal. All of the signal light emitted from the DFB lasers 23 to 26 are coupled by the star coupler 27, and amplified by an optical fiber amplifier 19 which has the same configuration as the optical fiber amplifier shown in FIG. 1. The amplified signal light is then branched by a branch device 20. Each branched light is transmitted through an optical fiber 21 and then received by a receiver 22. According to the optical fiber transmission apparatus with the above configuration, variations in the gain and the gain tilt are suppressed independent of changes in the number of signal light beams, the wavelength, and the input power. Thus, low-distortion analog optical fiber transmission can be realized where the CSO distortion characteristic generated by the interaction between a frequency-modulation component of the signal light and the gain tilt does not vary.

In the above examples, Er was used as the rare earth element to be doped into the optical fiber, and the oscillation wavelength at the laser diode was in the 1.55 µm band. The same effects were obtained when praseodymium (Pr) was used as the rare earth element and the oscillation wavelength at the laser diode was in the 1.3 µm band.

Thus, in the optical fiber amplifier according to the present invention, when signal light is amplified, it is simultaneously laser-oscillated in a wavelength band shorter than the wavelength of the signal light. With this operation, variations in the gain and the gain tilt are suppressed independent of a variation in the input power of the signal light. Thus, a stable operation can be achieved where the distortion characteristic generated by the interaction between a frequency-modulated component of the signal light and the gain tilt does not vary. As a result, according to the present invention, an optical fiber amplifier and an optical fiber transmission apparatus with reduced distortion can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical fiber amplifier comprising a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further includes:

a selector for selecting a portion of light of spontaneous emission generated in the rare earth doped optical fiber, which has a wavelength shorter than the wavelength of the signal light; and an optical fiber resonator for laser-oscillating the portion of light of spontaneous emission generated in the rare earth doped optical fiber, which is selected by the selector, thereby to keep a gain substantially fixed independent of a variation in the input power and wavelength of the signal light.

2. An optical fiber amplifier according to claim 1, wherein the optical fiber resonator selectively returns the portion of light of spontaneous emission generated in the optical fiber, which has a wavelength shorter than the wavelength of the signal light, to the rare earth doped optical fiber as feedback light.

3. An optical fiber amplifier comprising a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further comprises an optical fiber resonator for laser-oscillating a portion of light of spontaneous emission generated in the rare earth doped optical fiber, which has a wavelength shorter than the wavelength of the signal light, thereby to keep a gain substantially fixed independent of a variation in the input power and wavelength of the signal light, wherein the optical fiber resonator selectively returns the portion of light of spontaneous emission generated in the optical fiber to the rare earth doped optical fiber as feedback light, wherein the optical fiber resonator includes a feedback optical fiber for selectively allowing the portion of light of the spontaneous emission generated in the rare earth doped optical fiber, which has a wavelength shorter than the wavelength of the signal light to propagate therethrough, and wherein the feedback optical fiber includes filtering means.

4. An optical fiber amplifier comprising a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further comprises an optical fiber resonator for laser-oscillating a portion of light of spontaneous emission generated in the rare earth doped optical fiber, which has a wavelength shorter than the wavelength of the signal light, thereby to keep a gain substantially fixed independent of a variation in the input power and wavelength of the signal light, wherein the optical fiber resonator selectively returns the portion of light of spontaneous emission generated in the optical fiber to the rare earth doped optical fiber as feedback light, wherein the optical fiber resonator includes a pair of reflectors disposed at the both ends of the rare earth doped optical fiber, and the pair of reflectors selectively reflect the portion of light of spontaneous emission generated in the rare earth doped optical fiber, which has a wavelength shorter than the wavelength of the signal light.

5. An optical fiber amplifier according to claim 3, wherein the feedback optical fiber receives the portion of light of spontaneous emission generated in the rare earth doped optical fiber, which has a wavelength shorter than the wavelength of the signal light, from a signal light output side of the rare earth doped optical fiber, and supplying the portion of light to a signal light input side of the rare earth doped optical fiber.

6. An optical fiber amplifier according to claim 3, wherein the feedback optical fiber receives the portion of light of spontaneous emission generated in the rare earth doped optical fiber, which has a wavelength shorter than the wavelength of the signal light, from a signal light input side of the rare earth doped optical fiber, and supplying the portion of light to a signal light output side of the optical fiber.

7. An optical fiber amplifier according to claim 6, wherein the feedback optical fiber includes an optical isolator for selectively allowing only light traveling from the signal light input side toward the signal light output side of the rare earth doped optical fiber to pass therethrough.

8. An optical fiber amplifier according to claim 3, wherein the feedback optical fiber includes another rare earth doped optical fiber.

9. An optical fiber amplifier according to claim 4, wherein each of the pair of reflectors includes a wavelength filter and a reflection mirror.

10. An optical fiber amplifier according to claim 4, wherein each of the pair of reflectors includes a fiber grating.

11. An optical fiber transmission apparatus comprising:

the optical fiber amplifier according to claim 3;

a laser diode for outputting signal light modulated according to a multi-channel analog electric signal;

an optical fiber for transmitting the signal light amplified by the optical fiber amplifier; and a receiver for converting the signal light transmitted through the optical fiber into an electric signal.

12. An optical fiber transmission apparatus comprising:

an optical fiber amplifier comprising a rare earth doped optical fiber and a pumping light source for outputting pumping light for pumping the rare earth doped optical fiber, the optical fiber amplifier optically amplifying signal light received at an input end and outputting the amplified signal light from an output end, wherein the optical fiber amplifier further comprises an optical fiber resonator for laser-oscillating a portion of light of spontaneous emission generated in the rare earth doped optical fiber, which has a wavelength shorter than the wavelength of the signal light, thereby to keep a gain substantially fixed independent of a variation in the input power and wavelength of the signal light;

a plurality of laser diodes for outputting signal light beams having different wavelengths;

multiplexing means for mixing the signal light beams output from the plurality of laser diodes;

an optical fiber for transmitting the signal light amplified by the optical fiber amplifier; and a receiver for converting the signal light transmitted through the optical fiber into an electric signal.

13. An optical fiber transmission apparatus according to claim 12, wherein at least one of the plurality of laser diodes outputs signal light modulated in accordance with a multi-channel analog electric signal.

14. An optical fiber transmission apparatus according to claim 11, wherein the wavelength of the signal light is in a 1.55 µm band, and the rare earth doped optical fiber is doped with erbium (Er) ions.

15. An optical fiber transmission apparatus according to claim 12, wherein the wavelength of the signal light is in a 1.55 µm band, and the rare earth doped optical fiber is doped with erbium (Er) ions.

16. An optical fiber transmission apparatus according to claim 11, wherein the wavelength of the signal light is in a 1.3 µm band, and the rare earth doped optical fiber is doped with praseodymium (Pr) ions.

17. An optical fiber transmission apparatus according to claim 12, wherein the wavelength of the signal light is in a 1.3 µm band, and the rare earth doped optical fiber is doped with praseodymium (Pr) ions.

18. An optical fiber transmission apparatus comprising:

the optical fiber amplifier according to claim 4;

a laser diode for outputting signal light modulated according to a multi-channel analog electric signal;

an optical fiber for transmitting the signal light amplified by the optical fiber amplifier; and a receiver for converting the signal light transmitted through the optical fiber into an electric signal.

19. An optical fiber transmission apparatus comprising:

the optical fiber amplifier according to claim 3;

a plurality of laser diodes for outputting signal light beams having different wavelengths;

multiplexing means for mixing the signal light beams output from the plurality of laser diodes;

an optical fiber for transmitting the signal light amplified by the optical fiber amplifier; and a receiver for converting the signal light transmitted through the optical fiber into an electric signal.

20. An optical fiber transmission apparatus comprising:

the optical fiber amplifier according to claim 4;

a plurality of laser diodes for outputting signal light beams having different wavelengths;

multiplexing means for mixing the signal light beams output from the plurality of laser diodes;

an optical fiber for transmitting the signal light amplified by the optical fiber amplifier; and a receiver for converting the signal light transmitted through the optical fiber into an electric signal.

* * * * *